United States Patent Office 3,087,935
Patented Apr. 30, 1963

3,087,935
PROCESS FOR THE MANUFACTURE OF
COPPER PHTHALOCYANINES
Djavad Razavi, St.-Fons, France, and Walter Fioroni and
Hans Ulrich Meister, Binningen, Switzerland, assignors
to Ciba Limited, Basel, Switzerland, a Swiss company
No Drawing. Filed Feb. 14, 1961, Ser. No. 89,128
Claims priority, application Switzerland Feb. 26, 1960
8 Claims. (Cl. 260—314.5)

One of the most important processes for making copper phthalocyanines consists in heating phthalic anhydride or phthalimide with a copper salt, such as copper chloride, and a quantity of urea sufficient to form a melt. By the addition of a molybdate as catalyst the yield of this process can be considerably increased, but the yield is always below 70% calculated on the phthalic anhydride used as starting material. The reason for the considerable industrial importance of this process, notwithstanding the unsatisfactory yield, is the simplicity of the apparatus required.

Considerably higher yields are obtained by carrying out the reaction in an organic solvent. The greater yield obtained is, however, offset by the considerably higher cost due to the more costly apparatus required and the regeneration of large quantities of solvent.

The present invention is based on the observation that by heating a phthalic anhydride or phthalimide, a copper compound and urea in the presence of a molybdate copper phthalocyanine can be obtained in very good yield by using a high-boiling inert organic solvent in a proportion within the range of 10 to 60% by weight calculated on the total weight of the reactants.

Besides unsubstituted phthalic anhydride or phthalimide, there can also be used as starting materials substituted phthalic anhydrides or phthalimides, and especially halogenated phthalic anhydrides or phthalimides, for example, the anhydride of 4-chloro-3:6-dichloro- or 3:4-dichloro-phthalic acid. As copper compounds there are used, for example, copper salts, such as copper sulfate or a chloride of copper, especially cupric chloride, or an oxide of copper, more especially cuprous oxide. For every four molecular proportions of the phthalic acid derivative there are advantageously used approximately one molecular proportion of the copper compound. For 1 part of the phthalic anhydride or phthalimide there is advantageously used at least 1 part of urea, and the best results are obtained by using 1.5 to 2 parts of urea for each part of the phthalic acid derivative. The molybdate used as catalyst, advantageously ammonium molybdate, is preferably used in a proportion within the range of 0.1 to 5% by weight calculated on the total weight of the reactants. If desired, there may be used in addition another catalyst, for example, boric acid.

As high-boiling inert solvents there are advantageously used nitrobenzene or trichlorobenzene, alkylated benzenes, for example dodecyl-benzenes, naphthalene, methyl-naphthalene or anthracene. The proportion of the solvent must be within the range of 10 to 60% by weight calculated on the total weight of the reactants.

As large quantities of gaseous by-products are formed during the reaction it is of advantage either to heat the reaction mixture in the form of a thin layer or while it is maintained in continuous motion. In the first mentioned form of the process, the so-called baking process, the mixture of the reaction components and the solvent are advantageously heated on a rigid support, for example, on a baking plate, advantageously one made of stainless steel, and in an oven. The reaction temperature is advantageously within the range of 160 to 290° C., and more especially 180 to 220° C. As the greater part of the solvent slowly evaporates during the reaction, it is of advantage, in order to avoid loss of solvent, to use a reaction vessel which is provided with a condenser that enables the solvent vapour to condense outside the reaction vessel.

The second mentioned form of the process is advantageously carried out in a paddle drier (Venuleth drier). In this case a copper oxide, especially cuprous oxide, is especially suitable as a copper donor, and it is of advantage to use as solvent naphthalene, methyl-naphthalene or a high-boiling alkyl-benzene. The reaction temperature is advantageously within the range of 180 to 220° C.

The reaction is generally complete within a few hours. The reaction mixture is worked up in the usual manner by disintegrating it and subjecting it to extraction with a dilute aqueous acid and water.

Depending on the choice of the starting materials there is obtained an unsubstituted or, for example, a halogen-substituted copper phthalocyanine. The yields obtained are considerably higher than those obtained in the conventional baking process, and the products obtained correspond with regard to purity to the usual requirements and can be converted into a form suitable for use as pigments by one of the usual grinding or reprecipitation processes, for example, by reprecipitation from concentrated sulfuric acid.

The following examples illustrate the invention, the parts and percentages being by weight:

Example 1

2680 parts of urea, 319 parts of cupric chloride and 25 parts of ammonium molybdate are ground for 4 hours, and then 1680 parts of phthalic anhydride are added, and grinding is continued for 80 minutes. The mixture is then spread on a baking plate of stainless steel, the mixture is moistened with 1700 parts of nitrobenzene, and the whole is heated for 8 hours in an oven at an internal temperature of 195° C. The reaction mixture is then allowed to cool, disintegrated, and heated for ½ hour in 8000 parts of water containing 130 to 140 parts of hydrochloric acid of 34% strength. The mixture is then filtered while hot (the filtrate should be acid to Congo), the filter residue is washed with 30,000 parts of hot water, and the dried for 24 hours at 105° C. There are obtained 1384 to 1418 parts of copper phthalocyanine which represents a yield of 84.5 to 86.6% of the theoretical yield.

By using, instead of nitrobenzene, the same quantity of trichlorobenzene and otherwise working under the same conditions, there are obtained 1466 parts of copper phthalocyanine.

Example 2

222 parts of phthalic anhydride, 360 parts of urea, 29 parts of cuprous oxide, 2.15 parts of sodium molybdate and 60 parts of naphthalene are placed in a paddle drier of stainless steel provided with an ascending tube. In the course of 11 hours the apparatus is slowly heated to a temperature of 210° C. In the course of a further 2 hours the temperature is raised to 250° C., and the latter temperature is maintained for 1½ hours. The ascending tube is then replaced by a descending tube having a vacuum receiver, and, while the stirrer is out of action, the greater part of the naphthalene is distilled off while slowly lowering the pressure. There are recovered 40 parts of naphthalene. The heating is then discontinued, the paddle drier is released to atmosphere, and the mixture is allowed to cool while stirring. The copper phthalocyanine contaminated with acid-soluble by-products is then discharged, disintegrated in a roller mill, stirred at 95 to 100° C. in 6000 parts of water containing 400 parts of hydrochloric acid of 30% strength, and filtered while hot. The filter cake is washed with hot water until the washings are neutral, and the filter cake is then dried at 110 to 120° C. There are obtained 198 to 203 parts of copper phthalocyanine having a purity of 95 to 97%. This corresponds to a yield of 88 to 90% of the theoretical yield calculated on the phthalic anhydride.

What is claimed is:

1. A process for the manufacture of copper phthalocyanines which comprises heating at a temperature within the range of 160 to 290° C. a member selected from the group consisting of phthalic anhydride and phthalimide with a compound selected from the group consisting of cupric chloride and cuprous oxide and urea in the presence of ammonium molybdate, wherein the mixture contains a high-boiling inert organic solvent in a proportion within the range of 10 to 60% by weight calculated on the total weight of the reactants.

2. A process as claimed in claim 1 wherein for each part of the phthalic acid derivative, at least 1 part of urea is used.

3. A process as claimed in claim 1, wherein approximately 1 molecular proportion of the copper compound is used for every 4 molecular proportions of phthalic acid derivative.

4. A process as claimed in claim 1, wherein the reaction temperature is within the range of 180 to 220° C.

5. A process as claimed in claim 1, wherein the mixture of the reactants and the solvent is heated in the form of a thin layer by the baking process.

6. A process as claimed in claim 5, wherein a member selected from the group consisting of nitrobenzene and trichlorobenzene is used as solvent.

7. A process as claimed in claim 5, wherein the reaction is carried out in an oven which is provided with a condenser for condensing the solvent vapour.

8. A process as claimed in claim 1, wherein the mixture of the reactants and a solvent selected from the group consisting of naphthalene, an alkylated naphthalene and a high-boiling alkylated benzene is heated in a Venuleth drier.

References Cited in the file of this patent

UNITED STATES PATENTS

| | | |
|---|---|---|
| 2,318,783 | King et al. | May 11, 1943 |
| 2,382,441 | Reynolds et al. | Aug. 14, 1945 |
| 2,900,390 | Brouillard et al. | Aug. 18, 1949 |